Dec. 18, 1956 D. D. REGIER 2,774,495
UNLOADING UNITS FOR TRAILER WAGONS
Filed June 3, 1955 3 Sheets-Sheet 1
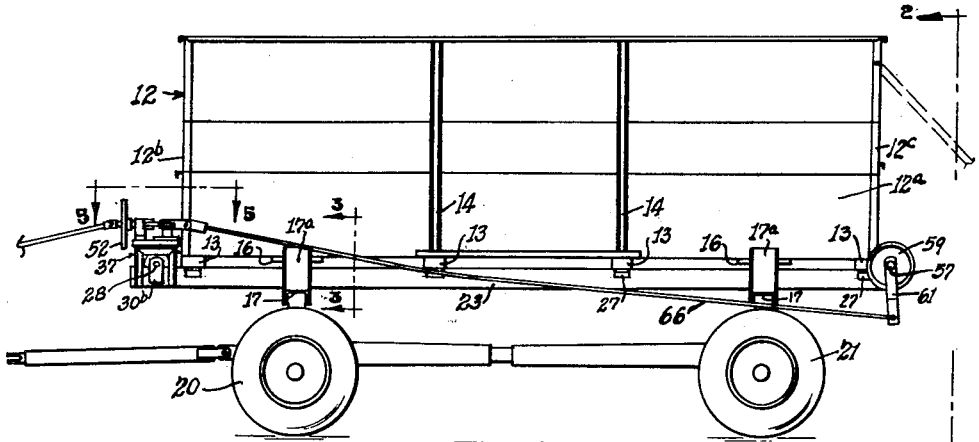
Fig. 1.
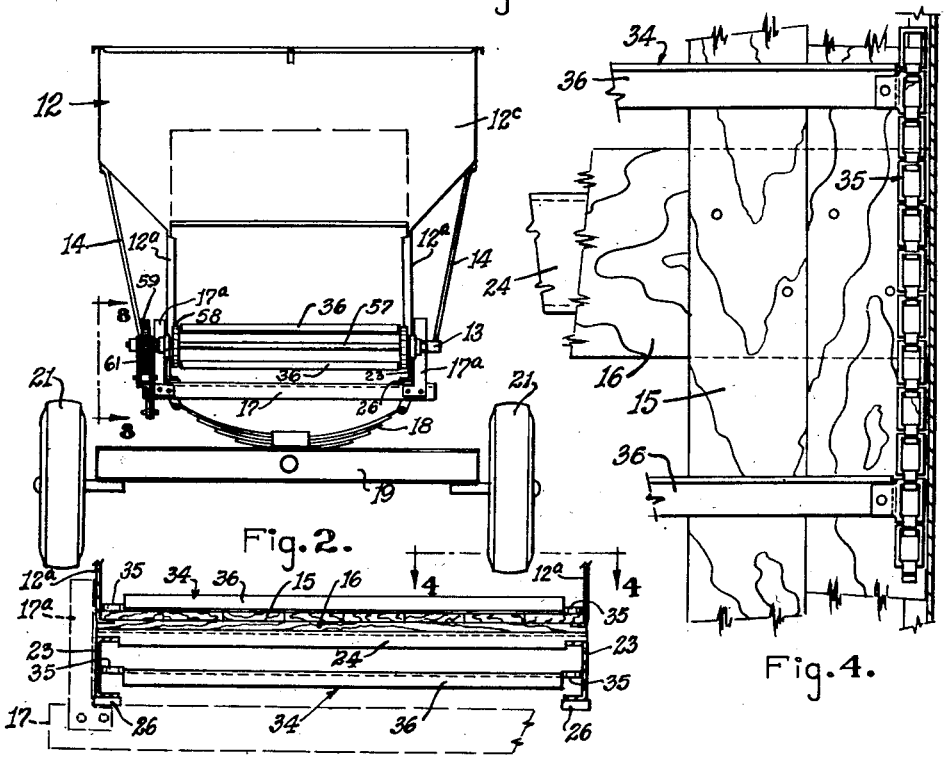
Fig. 2.
Fig. 3.
Fig. 4.
INVENTOR.
Dietrich D. Regier
BY Frank J. Schraeder Jr.
Attorney Dec. 18, 1956  D. D. REGIER  2,774,495
UNLOADING UNITS FOR TRAILER WAGONS
Filed June 3, 1955  3 Sheets-Sheet 2

INVENTOR.
Dietrich D. Regier
BY Frank J. Schraeder Jr.
Attorney

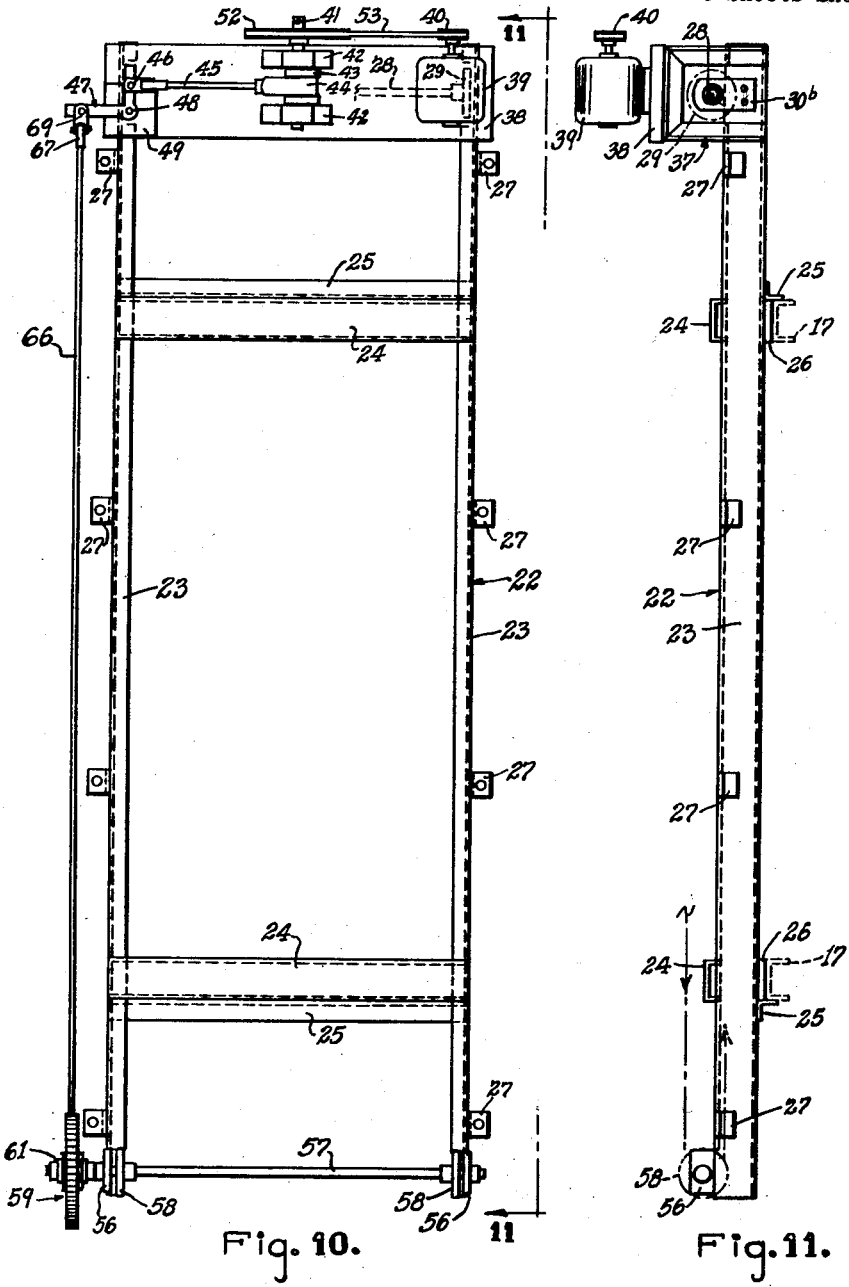

United States Patent Office 2,774,495
Patented Dec. 18, 1956

2,774,495

UNLOADING UNITS FOR TRAILER WAGONS

Dietrich D. Regier, Henderson, Nebr.

Application June 3, 1955, Serial No. 513,102

3 Claims. (Cl. 214—83.36)

When a farmer takes a load of wheat or other grain, or forage, to a silo or grain elevator, considerable time and labor must be expended in discharging the load from the wagon box.

The object of the present invention is to save the farmer manual labor and loss of time in unloading a farm trailer wagon.

Generally speaking, this object can be achieved by building farm wagons with self-contained, power operated, unloading apparatus. This is perhaps unnecessary and too expensive for most farmers when most farmers now have power-equipped tractors and available electric current.

Another object of my invention is to provide a completely operatively assembled unloading unit which will afford distribution of the wagon contents, such as fertilizer or feed, on the ground while the wagon is being moved, or for discharging its contents into a silo elevator while the wagon is in stationary position.

It is therefore my purpose to provide farmers with completely assembled unloading apparatus which can be applied to their present trailer wagons, and furthermore, be installed by the farmers themselves with the tools that every modern farmer already has on hand.

In order to be able to produce such unloaders at a low cost, there must be quantity production. This is practicable, because there is such a near approach to standardization of farm wagons, at the present time, that a unit intended for use in a particular line of wagons can be used successfully in various competitive wagons.

It may therefore be said to be the specific object or purpose of my invention to create a simple, efficient, inexpensive, completely operatively assembled self-contained unloading unit which can be completely manufactured and shipped in completely assembled operative form to farmers and which each farmer then easily can install underneath a wagon box upon the trailer chassis without rebuilding the wagon box or chassis; such unloading unit being adapted to be driven by power from two available sources, such as the power take-off shaft of a farmer's tractor operative when the wagon is being unloaded while moving over the ground and discharging fertilizer or cattle feed or when in stationary position when discharging its contents into a silo elevator, or an electric motor for operating the unit when the wagon is in stationary position as when discharging its contents into a silo elevator; both facilities being already provided on the assembled unloading unit.

The various features of novelty whereby the present invention is characterized will hereinafter be pointed out with particularity in the claims, but, for a full understanding of the invention and of its objects and advantages, reference may be had to the following detailed description taken in connection with the accompanying drawings, wherein:

Figure 1 is a side elevational view of a farm trailer wagon equipped in accordance with the present invention.

Fig. 2 is a rear end view of the wagon looking in the direction of the arrows 2—2 of Fig. 1.

Fig. 3 is a transverse, vertical section through the wagon box, on a slightly larger scale, partially broken away, taken on line 3—3 of Fig. 1.

Fig. 4 is a partial top plan view of the floor of the wagon box taken on line 4—4 of Fig. 3 showing a portion of the unloading conveyor.

Fig. 10 is a plan view of the completely assembled unloading unit including the combined unitary frame structure and power driven mechanism for propelling the conveyor web; the conveyor web not being shown for purposes of clarity to more fully show the unitary frame of the unit.

Fig. 11 is a side elevation of the unit taken on line 11—11 of Fig. 10.

Figures 5, 6, 12:
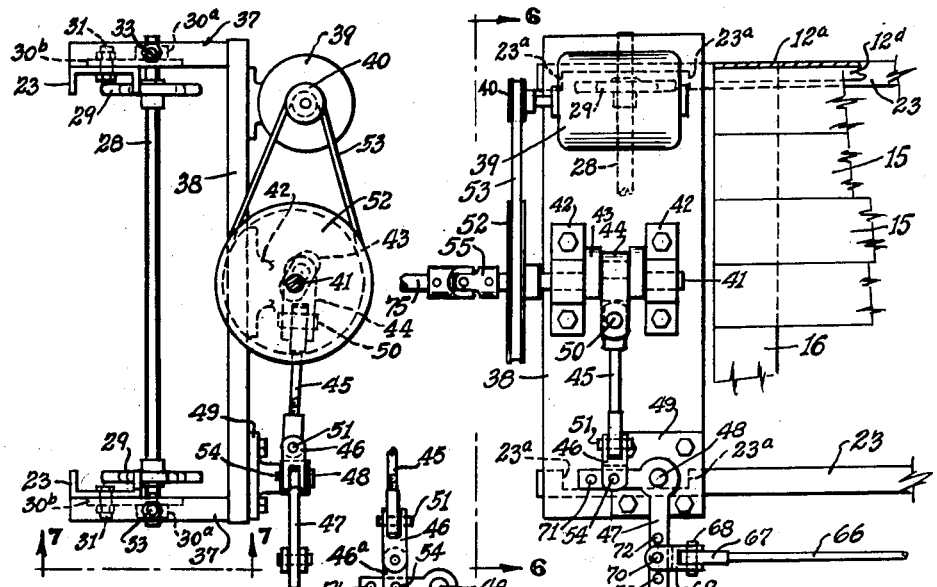
Fig. 5 is a plan view of the front end of the drive mechanism; a front portion of the wagon box floor being shown.
Fig. 6 is a section taken on line 6—6 of Fig. 5.
Fig. 12 illustrates modified link connections to the bell-crank adapted for selectively varying the speed of the unloading conveyor.

Referring to the drawings, Figs. 1 and 2 generally illustrate a typical standard trailer wagon box 12 having side walls 12$^a$ and end walls 12$^b$ and 12$^c$. These standard steel wagon boxes are mounted on transverse bolsters 13 and secured thereto by vertically disposed tie rods 14 laterally spaced in the medial portions of the sides of the box 12.

The wagon box is provided with a floor consisting of longitudinally disposed wood planks 15 secured to longitudinally spaced transverse cleats 16 bolted to the bolsters 13 and to the inturned edges 12$^d$ of the bottoms of the side walls 12$^a$.

As furnished by the trailer wagon manufacturer, without my improved unloading unit, the wagon box is mounted on a wheeled chassis consisting of front and rear end transverse channel iron bolsters 17 mounted on elliptical springs 18 carried on the front and rear axle beams 19 that are supported at the front end of the trailer on a pair of steerable wheels 20 and at the rear end of the trailer on a pair of wheels 21.

To retain the wagon box 12 centered on the bolsters 17 against transverse shifting movement, the box 12 is confined between the vertically disposed channel arms 17$^a$ suitably secured to and near the outer ends of the bolsters 17.

My improved completely self-contained unloading unit consists of a unitary supporting steel frame structure, a complete endless conveyor web, and a complete conveyor drive mechanism including selectively alternately applicable power transmitting means consisting of an electric motor drive and a power take-off shaft operable connection.

The unitary steel frame structure 22 consists of a pair of elongated laterally spaced side channels 23 transversely reenforced by a pair of laterally spaced channels 24 having short portions at the ends of their flanges recessed for and welded to the top flanges of the channels 23. A pair of transversely disposed angle irons 25 are welded at their outer ends to the bottom faces of the lower flanges of the side channels 23; the outer opposed sides of the vertically disposed legs of these angle irons 25 being vertically aligned with the outer sides of the outer flanges of the pair of transverse channels 24. A pair of spacer plates 26 are welded to the bottom faces of the lower flanges of both side channels 23 adjacent to the opposed vertical legs or angle irons 25; the width of each spacer plate 26 being equal to the width of the flange of the side channel 23 and the length thereof being equal to width of the web of the transverse channel 24 disposed directly above it.

The transverse channels 24 function to reenforce the frame 22 and also as supports for the cleats 16; the angle irons 25 function to reenforce the frame and also to prevent the frame 22 from shifting longitudinally on its supporting bolsters 17; and the spacer plates 26 function to provide ample clearance between the lower run of the conveyor web and the tops of the bolsters 17 as more clearly shown in Fig. 3.

Suitable short angle irons 27 are welded to the upper edges of the outer faces of the webs of the side channels 23 with their respective horizontal legs in plane alignment with the top faces of the upper flanges of the channels 23 and these angle irons 27 function as connections between the bolsters 13 and the frame side channels 23.

As more clearly shown in Figs. 5, 6, 7, 10 and 11, the front ends of the frame 22 extend forwardly beyond the front end of the wagon box 12 to thereby provide a support for the conveyor front shaft 28 and the conveyor power driven mechanism.

The front conveyor shaft 28 has rigidly secured thereto a pair of chain sprockets 29 disposed within recessed portions 23$^a$ of the upper flanges of the side channels 23; each end of shaft 28 being rotatably supported in a combined bearing and conveyor web tightener comprising a bearing portion 30$^a$ and an integral extension 30$^b$ adapted to be secured by a pair of bolts 31 that extend through a pair of elongated holes 32 in the web of the side channel 23 whereby upon tightening the bolt 33 the conveyor web 34 may be properly operatively tightened.

The unloading conveyor web 34 comprises a pair of sprocket chains 35 arranged as a pair of laterally spaced endless belts carrying a plurality of transverse flights 36, preferably angle irons, spaced longitudinally of the conveyor; the upper run of the conveyor web 34 being slidably movable on the wagon box floor 15 and the lower run being disposed for movement between the transverse channels 24 and the bolsters 17 between the webs of the side channels 23.

Angle iron frame supports 37 secured in any suitable manner, as by welding, to the outer sides of the side channels 23 bridge the conveyor web tighteners 30$^a$, 30$^b$ and support the web tightener bolt 33. Secured to the tops of the angle iron supports 37 is a base plate 38 which carries the conveyor drive mechanism which consists of an electric motor 39 equipped with a drive pulley 40. A driven shaft 41 supported in a pair of bearings 42 is provided with a pair of laterally spaced crankarms 43 that carry between them the drive head 44 of a connecting rod 45 that includes at its outer end a link 46 for pivotally connecting the rod 45 with one arm of a bellcrank 47 that is pivotally supported on the vertical stud 48 of a cast iron base secured to the plate 38.

The inner end of the connecting rod 45 is pivotally secured to the drive head 44 as by a vertical pin 50 and the outer end of the rod 45 is pivotally secured to the link 46 by a horizontal pin 51; a vertical pin 54 pivotally connecting the link 46 to the bellcrank 47.

Secured to shaft 41 is a pulley 52 that is driven by belt 53 trained over the motor driven pulley 40. The outer end of shaft 41 is provided with a suitable power take-off drive connection 55.

Figure 9:
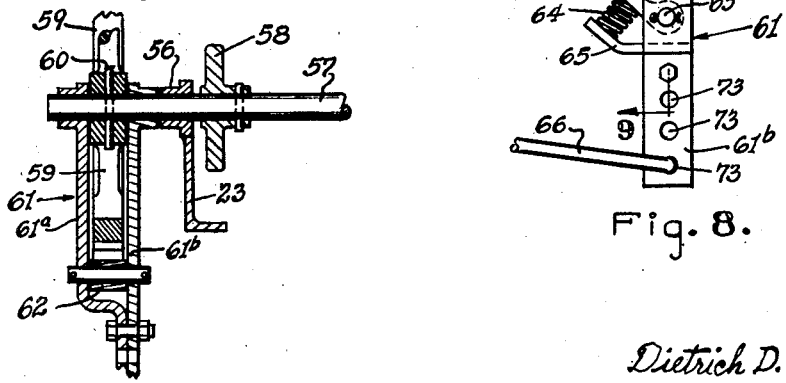
Fig. 9 is a vertical section of the pawl and ratchet wheel drive taken on line 9—9 of Fig. 8.

The frame side channels 23 extend outwardly at their rear ends beyond the wagon box to provide supports for the bearings 56 which are welded to upper portions of the webs of the channels 23, as more clearly shown in Fig. 9, and these bearings rotatably support the rear conveyor shaft 57 that has rigidly secured to it the pair of rear sprockets 58 for the conveyor web chains 35.

The conveyor shaft 57 extends at one outer end beyond its adjacent bearing 56 to constitute a support for a ratchet wheel 59 that is fixed to the shaft 57 as by a pin 60.

A yoke 61 is pivotally suspended from shaft 57 and has opposed arms 61$^a$ and 61$^b$ that embrace opposite sides of the ratchet wheel 59. A pawl 62 is pivotally supported on pin 63 between the arms 61$^a$ and 61$^b$ and is normally maintained in engagement with the teeth of the ratchet wheel 59 by a coil spring 64 supported on a plate 65 extending from the arms 61$^a$ and 61$^b$. The arm 61$^b$ extends downwardly beyond the lower end of arm 61$^a$ to provide an operative connection for the rear end of a link-rod 66. At the front end, the link-rod 66 is provided with a connection head 67 that is pivotally connected by a horizontal pin 68 with a short link 69 which is pivotally connected by a vertical pin 70 with the bellcrank 47.

The unloading conveyor web is adapted for intermittent movement by the mechanism shown in Figs. 5, 6, 8 and 9 power-driven by the electric motor 39 or tractor power take-off shaft 75 including the reciprocating connecting rod 45 driving the bellcrank 47 which reciprocates the link-rod 66. The rear end of the link-rod 66 oscillates the yoke 61 to thereby cause intermittent rotation of the ratchet wheel 59 by the spring-pressed pawl 62 whereby the rear conveyor shaft 57 and its sprockets 58 impart intermittent movement to the conveyor web 34; a suitable spring-pressed pawl 74 preventing reverse rotation of the ratchet wheel 59 as it intermittently drives the unloading conveyor web in its unloading movement.

Figures 7, 8:
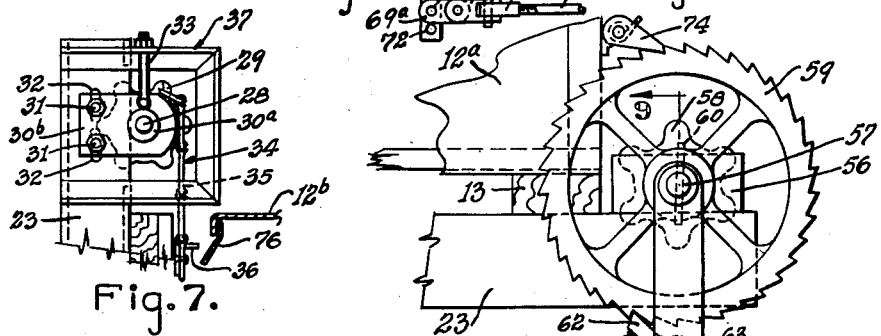
Fig. 7 is a side view taken on line 7—7 of Fig. 6 illustrating the conveyor web tightener.
Fig. 8 is a side elevation of the pawl and ratchet wheel drive at the rear end of the unit.

As shown in Fig. 12, I provide means for adjustably selectively varying the speed of the conveyor. In one instance, the link 46$^a$ may be selectively connected with the bellcrank 47 by the selective insertion of pin 54 in either one of a pair of holes 71; in another instance, the link 69$^a$ may be connected with the bellcrank 47 by the selective insertion of pin 70 in either one of the plurality of holes 72; still in another instance as shown in Fig. 8, the rear end of the link-rod 66 may be selectively connected within either one of a plurality of holes 73 in the yoke arm 61$^b$.

From the above description and appended drawings, it will be readily seen that I have provided a compact, practical and economical unloading unit for trailer wagons that can be readily mounted between the wagon box and the chassis of the trailer with only a single opening provided in the lower end of the front wall of the wagon box for passage therethrough of the conveyor web; a suitable canvas flap 76 secured to and depending from the top edge of the opening preventing flow of the grain through such opening at the front end of the conveyor web.

It will also be seen that the unloading conveyor may be readily electrically driven by the electric motor 39 or by a tractor power take-off shaft 75 coupled to the connection 55.

The completely assembled unloading unit includes a unitary frame with conveyor and complete drive mechanism thereon adapted to be mounted between the wagon box 12 and its supporting wheeled chassis by simply lifting the box and then inserting the unloading unit between the box and the chassis.

The conveyor web consisting of the pair of side sprocket chains and the spaced flights may preferably be shipped, in cylindrical roll form, separately from the frame and drive mechanism and, after the frame and drive mechanism are mounted on the chassis, the upper run of the conveyor web may be threaded through the wagon box and the lower run threaded between the side channels of the unitary frame and, with the side conveyor chains properly operatively engaged with their respective front and rear end sprockets, the web may then be coupled together to constitute an endless conveyor.

While I have shown and described a preferred embodiment of my invention, it will be understood that various changes in the form and details of the apparatus illustrated may be made by those skilled in the art, without departing from the spirit of the invention embodied in the appended claims.

I claim:

1. A self-contained completely operable and assembled unloading unit adapted to be mounted between a wagon box and the chassis of a wheeled trailer comprising: a unitary steel supporting frame having laterally spaced elongated side channels extending beyond the front and rear ends of the wagon box; an endless unloading conveyor web having an upper run movable upon the floor of the wagon box and a lower run movable below the floor of the wagon box within said frame and comprising a pair of endless sprocket chains carrying material-moving flights; a front conveyor shaft, rotatably mounted on the front extension of said frame channels, having a pair of sprockets secured thereto for engagement with said chains; conveyor chain tighteners carried on said frame front extension; power-actuated conveyor driving means carried on said frame front extension; a rear conveyor shaft, rotatably mounted on the rear extension of said frame, having a pair of drive sprockets secured thereto in engagement with said endless chains; power transmitting means, for rotating said rear conveyor shaft, operatively connected with said power-actuated driving means; said power-actuated driving means comprising a conveyor drive mechanism consisting of an electric motor, a crankshaft adapted to be driven by said motor, a connecting rod reciprocated by said crankshaft, a short link connecting said connecting rod with one arm of a bellcrank that is pivotally supported on said front frame extension, a link-rod connected at one end by a short link to the other arm of said bellcrank for transmitting reciprocatory motion to a pawl and ratchet wheel drive operatively connected with said rear conveyor shaft; and a power take-off shaft driving connection on the outer end of said crankshaft.

2. A self-contained unloading unit as set forth in claim 1 wherein the arms of said bellcrank each contain a plurality of holes, and wherein there is an additional link pivotally connected to the outer end of each of said short links, said additional links being adapted to be pivotally connected within a selected one of said plurality of holes in said crankarms, and wherein said pawl and ratchet wheel drive includes a yoke embracing said ratchet wheel and supported on one end of said rear conveyor shaft for support thereon of the ratchet wheel actuating pawl including a plurality of holes in the free end of said yoke adapted for alternative selective connection with the other end of said link-rod.

3. A self-contained unloading unit adapted to be interposed between a trailer wagon box and a wheeled chassis therefor comprising: a unitary steel frame consisting of a pair of laterally spaced elongated side channels having front and rear end portions that extend beyond respectively front and rear ends of the wagon box, said side channels being transversely reenforced in their medial sections at their upper flanges by a pair of wagon box supporting transverse channels, a pair of transverse angle irons extending below and interconnecting the lower flanges of said side channels and each having a vertical leg disposed adjacent a transverse bolster carried on the trailer chassis, a plurality of comparatively short angle irons spaced longitudinally of the frame and secured to the outer sides of said side channels with the top faces of their horizontal legs plane-aligned with the top faces of the upper flanges of said side channels and constituting connections for the ends of transverse bolsters that carry the floor of the wagon box, an unloading conveyor including front and rear sprocket-carrying shafts rotatably carried on respectively the front and rear extensions of said side channels, a circuitous conveyor web trained around and in operative engagement with the sprockets on said front and rear shafts and having its upper run slidable on the floor of the wagon box with its lower run movable within said frame between said wagon box supporting transverse channels and said transverse angle irons, mechanism carried on the front extension of said side channels for propelling the conveyor web including an electric motor and a power take-off shaft connection, said motor and power take-off shaft connection being selectively alternately operable to power drive said mechanism, means for imparting rotation to the rear sprocket-carrying shaft, and power transmitting means operatively interconnecting said means for imparting rotation to said rear sprocket-carrying shaft with said mechanism.

References Cited in the file of this patent

UNITED STATES PATENTS

| 1,497,622 | Weber | June 10, 1924 |
| 2,478,583 | Hybbert | Aug. 9, 1949 |
| 2,552,953 | Gaddis | May 15, 1951 |
| 2,569,191 | Peterson et al. | Sept. 25, 1951 |
| 2,635,772 | Rosheim | Apr. 21, 1953 |